Figure 1:
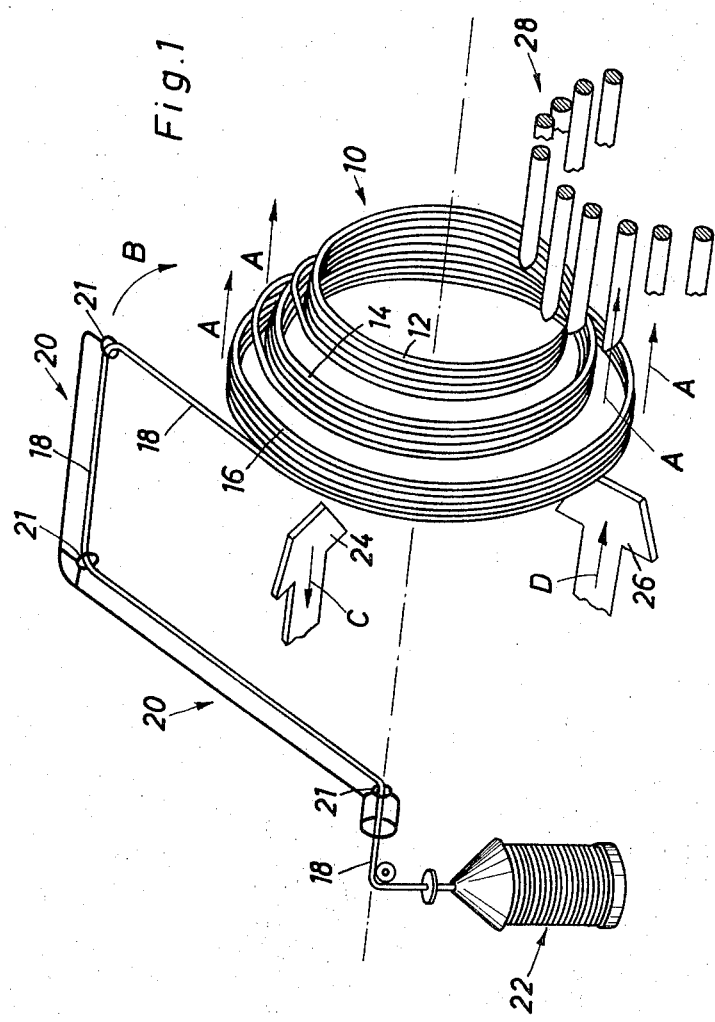

United States Patent [19]
Droll et al.

[11] 3,872,897
[45] Mar. 25, 1975

[54] PROCESS AND DEVICE FOR THE WINDING OF COILS FOR STATORS OF ELECTRIC MACHINES

[75] Inventors: Hans Droll; Willi Muskulus, both of Bergen-Enhkeim, Germany

[73] Assignee: Balzer & Droll K G, Niederdorfelden, Germany

[22] Filed: June 25, 1973

[21] Appl. No.: 373,239

[30] Foreign Application Priority Data
Feb. 28, 1973 Germany............................ 2309837
Apr. 18, 1973 Germany............................ 2319651

[52] U.S. Cl. .............................................. 140/92.1
[51] Int. Cl............................................... B21f 3/04
[58] Field of Search...................... 140/92.1; 242/81

[56] References Cited
UNITED STATES PATENTS
3,538,959  11/1970  Eminger............................ 140/92.1
3,672,040   6/1972  Arnold.............................. 140/92.1
3,765,080  10/1973  Lauer............................... 140/92.1

Primary Examiner—Lowell A. Larson
Attorney, Agent, or Firm—Sughrue, Rothwell, Mion, Zinn & Macpeak

[57] ABSTRACT

The invention relates to a process and a device for the winding of coils for stators of electric machines. Coil winding machines for the pre-fabrication of coils which, after the winding, are inserted into the stators are known. The winding is mostly achieved by means of a rotating flyer which feeds the wire to a stationary winding form. When this winding operation is completed the machine is stopped and the wound coil or coil groups are removed by means of a transfer tool.

13 Claims, 10 Drawing Figures

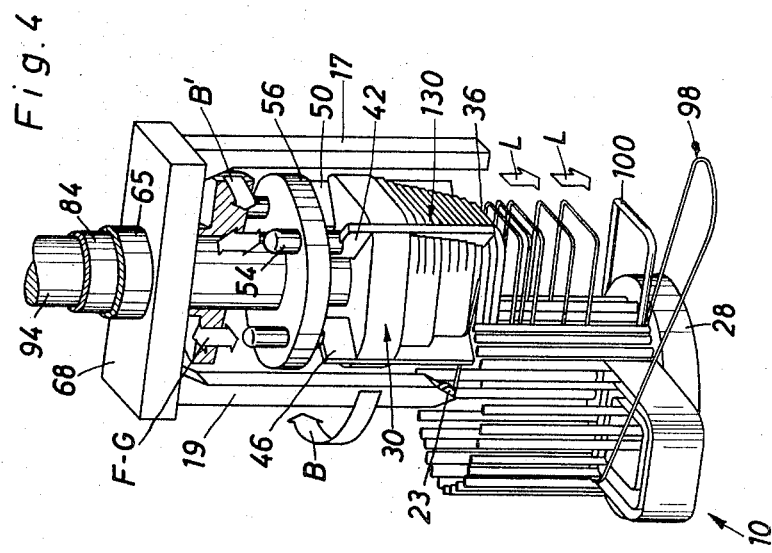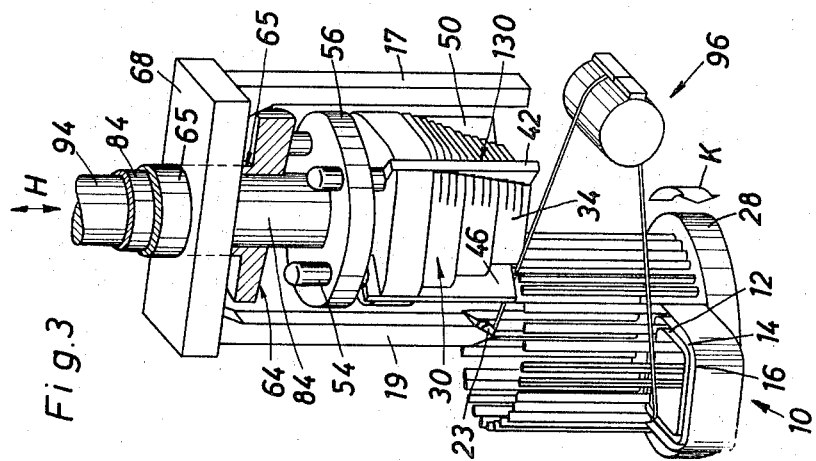

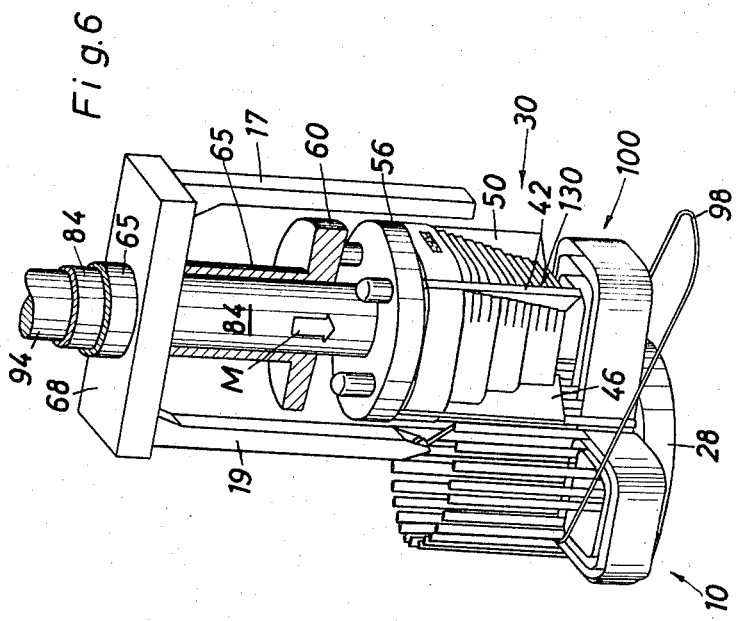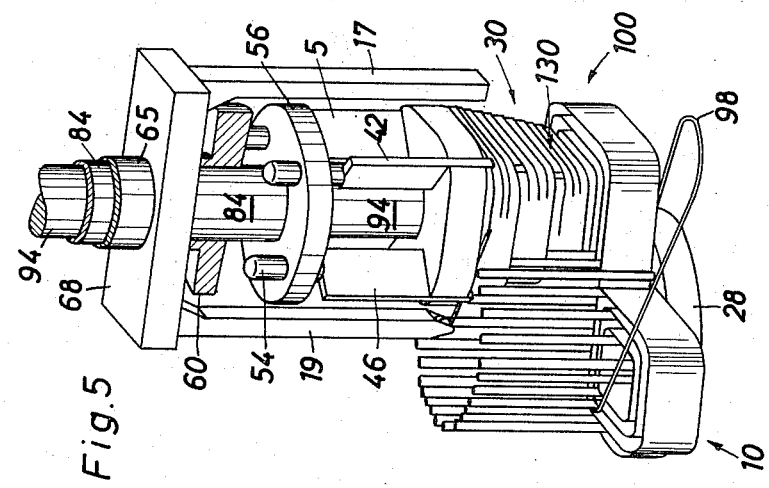

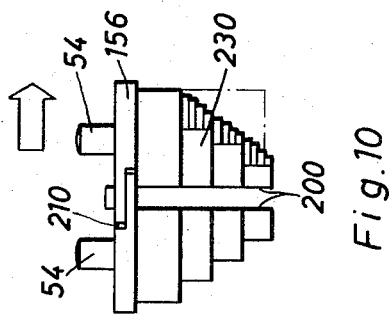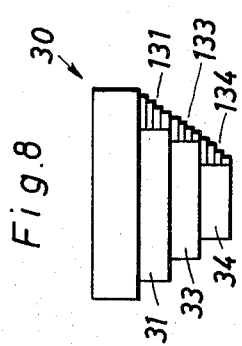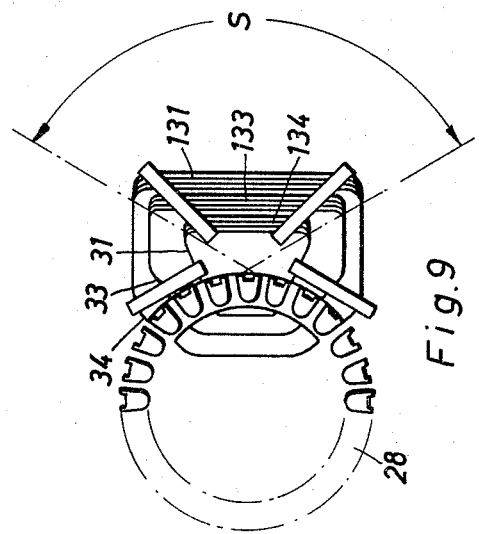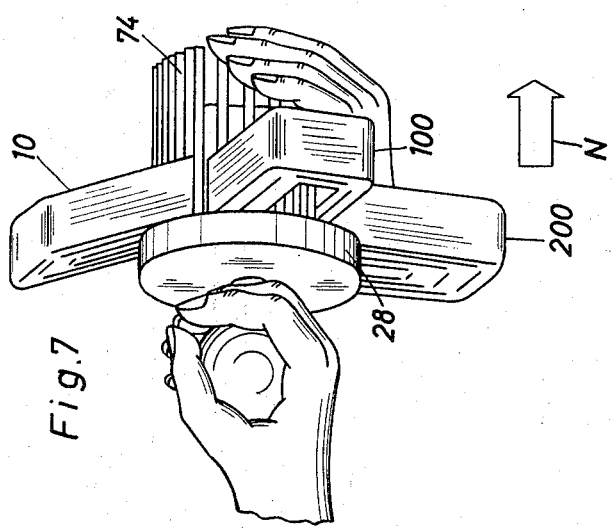

PROCESS AND DEVICE FOR THE WINDING OF COILS FOR STATORS OF ELECTRIC MACHINES

In order to avoid the disadvantage of the standstill and to thereby avoid any discontinuity in the production flow, it is known to use (from DT AS 1 920 801) a one-piece, axially relatively short coil body as form, which possesses a part at least tapered in an axial direction and a part at least rectilinear, the latter being a prolongation of the tapered part. As a result of the tension of the wound wire, each coil wound on the tapered part in an axial direction keeps on sliding, so that a continuous removal is possible when, after the standstill of the rotary motion, all coils remaining on the cylindrical sections are stripped off by rods.

This arrangement has different disadvantages. The angle of inclination of the tapered parts must be adjusted to the angle of friction of the coil. The angle of friction however is dependent on the thickness and on the material characteristics of the wire and of the insulating layer. Therefore, for different wires, coil bodies with different inclinations must be kept ready in order to always fulfill the requirement that the angle of inclination is greater than the angle of friction. In this respect it is evident that the angle of inclination cannot be selected at random. In case of a too steep angle there is a risk of laying various coils one on each other or of a too great tension of the wire.

Another disadvantage is that it is not possible to graduate a winding form at random. Each grade of the known machine needs a minimum height which is determined by the size of the inclination.

On the other hand, the height of the grades must be determinable in accordance with the size and shape of the coil to be wound. In this connection it can be necessary to select the grade height smaller than it should be according to the angle of inclination and such a requirement cannot then be fulfilled. Furthermore, all windings wound by the known machine have all the same length. In practice, however, the problem arises to manufacture coils with windings of unequal lengths in order to produce favourable coil end forms. When inner windings are shorter than outer windings, there results a desirable saving of space and copper. This requirement cannot be fulfilled by the known machine.

Furthermore, in the case of the known machine, the incline tapered longitudinally ends in a cylindrical part. Although, in principle, a reduction of the axial overall length, as opposed to known forms, is attained, the necessary cylindrical parts still imply a certain minimum overall length which must be respected. Moreover, there is no more friction on the cylindrical part since the inner diameter of the winding at that place is greater than that of the cylindrical part. True, due to the previously occurred deviation, a sort of spring effect in the wire material results which leads to an adherence also on the cylindrical part, however this is a phenomenon which cannot be influenced. Finally, it is still another disadvantage that the winding form of the known machine must be necessarily a rotating body completely enclosed in the surface area, in order to guarantee at all times the friction on the inclined area.

The present invention avoids all disadvantages and solves the problems in a simple manner. The task consists in winding a coil of wire formed or formable at random on forms as short as possible in such a way that they can be continuously removed. The solution according to the invention consists in general in a working process which thereby distinguishes itself in that the stripping-off of the wound wire during the winding ensues continuously by means of a mobile stripper moving synchronously with the winding operation which makes room for the addition of new windings on the winding form and shifts wound windings in the stripping direction obliquely to the winding plane surface.

According to one of the forms of the invention, it is also possible to wind multilayer coils in accordance with the principle of the invention. For this purpose multistage winding forms according to the known technique are used. Contrarily to the stand of the technique, these winding forms can be kept very short axially. As is known, all stages are wound one after the other without the winding operation being interrupted when changing from one stage to another stage. Hereby the strippers could, independently from the short back and forth axial motion, perform a possible stroke over a greater axial length in order to strip each time the last winding of the corresponding stage before the winding on the next stage has begun. Since this stopping to be provided at intervals means a loss of time, it is possible, according to the present invention, to advantageously continue the winding also when shifting from one stage to the next stage and then only at the end of the winding operation to strip off with one single common axial movement all strippers of all rest windings of all stages.

In the execution of this inventive idea it is possible to manufacture in a continuous working operation multipart electric coils for electric machines which are to remain connected in series. Hereby the winding is performed directly in the known manner in a special transfer tool provided with a crown of rods. This tool executes an index movement after the complete taking over of the one-layer or multilayer coil, whereby however the wire does not need to be interrupted. A wire loop is built by a holder and held tight so long until the winding of a following coil begins which is then taken over in a neighbouring group of rods in the rod crown of the tool.

Another arrangement of the process consists in that it can be made possible to vary the length of a winding on a winding form stage. For this purpose all or some of the form stages let themselves be submitted a least partly to a fine subdivision, as explained more precisely hereafter in connection with the characteristics of the device.

A favorised form of execution of a device for the accomplishment of the process starts from the known contrivance with a wire guide opposite a winding form in an adjustable radial range movable in the peripheral direction. It is a novelty that in the winding form several stripping agents are movable axially back and forth, synchronously with the motion of the winding, thereby, in the one final position, moving the wound wire on the winding form in the axial stripping direction and, in the other final position, making possible the laying-on of a new winding at the spot of the wire guide, whereby the motion of the wire guide is synchronized with the motion of the stripping agents.

The winding form, advantageously enough, is axially mobile and the strippers, besides the back and forth motion, can also execute an axial stroke which drives at the same time all the stripping agents axially through the winding form.

The most important advantage lies in the possibility to continuously remove coils at random during the winding. Up to now, these had been inserted only when the winding process was completely or partly finished and the machine had been stopped for the stripping. Another advantage is that any wire with a different coefficient of friction or other material characteristics can be processed, since the form does not need to be especially adjusted for these changing requirements. The gradations of the form can be shaped entirely freely. The form can be built very short and simply, as it is no longer necessary to maintain the part of the coil already wound on the form. No closed surface area is necessary and the form can be shaped of several parts. It would even be sufficient to use a winding form made out of simple single pins.

The axial back and forth motion can be advantageously derived from the winding motion by means of a swash plate.

According to an important execution of the invention, single or all stages of the winding form can be subdivided, at least by way of the circumference, into fine stages. Each one of these finely subdivided stages can be continuously or at intervals be brought into the winding range by means of an appropriate axial advance. In this manner it is possible to vary the length of the winding on one stage.

When now the fine subdivision is on a part of the circumference, a transfer tool can be inserted axially in the opposite part. The fine subdivision can be favourably extended over an arc of 120°.

It is also favourably possible to divide the new winding form axially at random so that, by means of an adjustability of the form in a radial direction, different diameters of the form for different sizes of coils are made available.

Further details of the invention are given in the following description of examples of executions shown on drawings.

Figure 2:
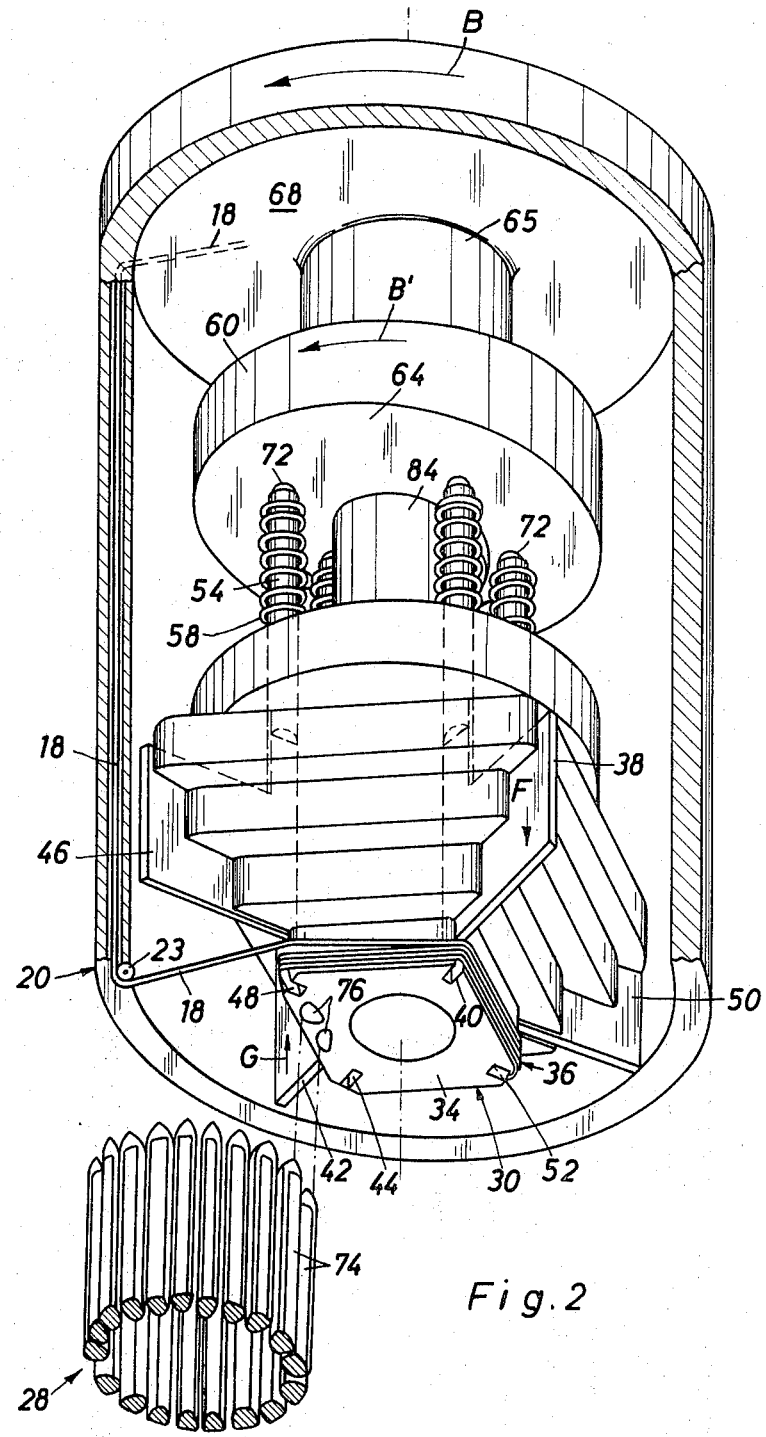

These drawings represent:

FIG. 1 a diagrammatic perspective survey, in order to make plain the new process, FIG. 2 a diagrammatic perspective representation of a type of execution of the new device, FIGS. 3 to 6 four different positions in a sligthly modified perspective, as compared with FIG. 2, FIG. 7 a perspective view of a tool with windings taken over, FIG. 8 a diagrammatic top view of a winding form, FIG. 9 a view against another modified type of execution, FIG. 10 a diagrammatic top view of the other modification.

The basic pattern of the new process is explained with the aid of FIG. 1. The result of the production is a freely wound coil 10. In the present example this coil 10 consists of an inner winding layer 12, a middle winding layer 14 and an outer winding layer 16. Of course, it is also possible to wind a coil with only one layer or one with more than three layers. In the case of the coil represented with three layers the middle layer 14 slides over the inner layer 12 and the outer layer 16 over the middle layer 14. This operation is indicated by arrow A and can be done either by receiving the coil on a tool 28 or by inserting the coil in different slots of a stator of an electric machine.

The wire 18, which is to be wound, is taken from a supply source 22 and led to coil 10 by a wire guide 20 over hooks 21. This wire guide 20 moves relatively toward coil 10, as indicated by arrow B. This relative motion, which can also take place in the opposite direction, is synchronized with the back and forth motion of the stripping agents 24, 26. In the diagrammatic representation of FIG. 1 there is a stripper 24 in the area of the winding which has just been fed and therefore at a clear distance from the last winding which is just coming into being, as indicated by arrow C.

On the other hand there is a stripper 26, as per arrow D, in an active position, in which the wound wires are shifted in the direction of arrow A and thereby stripped. An advantage of the invention is that the fed wire 18 between the last hook 21 and the coil 10 is always in an adjustable range during the winding process. As soon as the wire guide 20 arrives in this range in the peripheral direction of this range in the area of stripper 26, the latter is also in a retired position, whereas for instance the stripper 24 performs its stripping function during that time.

In this manner each winding of a coil, and thereby the whole coil is stripped off immediately after the winding process, that is to say moved axially and led, for instance, to a transfer tool or retracting tool 28.

For the execution of the process different devices are imaginable. Some types of executions are represented in modified forms in FIGS. 2 to 8. Each representation shows a different execution or method of employment and is not drawn according to the scale of the others.

In FIG. 2 a device is represented diagrammatically and perspectively with a quadruple graded prismatic winding form 30. This winding form 30 can have any sectional form and any amount of stages. The amount of the stages and their form depend on the size and shape of the coils to be wound. The forms are interchangeable and adjustable tools.

By means of a wire guide 20 a wire 18 is led to an adjusted stage — in this case it is the smallest stage 34 — in such a manner that the wire guide 20 moves in this case around the stationary winding form 30 in the direction of arrow B. This results in a winding layer 36 on the stage 34. The relative motion of wire guide 20 and winding form 30 could theoretically also be adjusted inversely so that wire guide 20 is the part which is stationary. In this variant however the wound layer 36 cannot be removed in the advantageous manner described here.

The strippers 24 and 26, which are only schematically represented on FIG. 1 are plate-shaped in the examples described in the next diagrams and are axially movable in radial slots in the winding form. In FIG. 2 four plates are provided and are recoghizable. A plate 38 is movable back and forth vertically in an appropriate slot 40, likewise a plate 42 in a slot 44, a plate 46 in a slot 48 as well as a plate 50 in a slot 52. The drive results through tappet 54 which is connected with the proper plates and located in a perforated disk 56. The unit consisting of the respective plate and the thereto belonging tappet 54, under the pressure of a spring 58, lies constantly against a swash plate 60. The swash plate 60 lies in a radial plane and shows an inclined surface 64 to this plane. The tappet 54 lies by spring tension against this surface 64. The swash plate 60 is fitted on a hollow shaft 65 and the latter rotates with the wire guide 20 in the direction of arrow B, so that the swash plate 60 also rotates in the direction of arrow B.

This rotation is transmitted synchronously to the adjacent tappet 54 through the motion of the wire guide 20 from the inclined surface 64 over bearing balls 72. The inclination of the surface 64 is set in such a manner that always this very tappet 54 with the corresponding plate, which takes in the farthest drawn-in axial position in the slot, lies nearest radially to a roll 23 (corresponds to hook 21/FIG. 1) of the wire guide 20. In the examples shown on FIGS. 2 to 6, it is at each time the tappet 54 which is connected with the plate 46, whereas in this example with four plates equally distributed in the circumferencial direction, the diametrically opposite plate 50 lies in its slot 52 immediately against the winding layer 36 and shifts at this place the binding layer axially downwards on the winding stage 34. In this position the two other plates 38 and 42 are in a middle position in their corresponding slot 40, respectively 44, whereby at that moment the plate 38 performs a motion in the direction of the arrow F and the plate 42 a motion in the direction of the arrow G. After another rotation of approximately 90° the plate 38 is then in its effective position, whereas the plate 42 is in its completely withdrawn position, in order to enable a further winding of the wire 18.

At this place let it be observed that of course the needed amount of plates, can be chosen freely their amount and the position of the arrangement can be chosen freely in optimum accordance with the shape of the winding form.

The coil continuously wound in this manner is also removed continuously and that suitably, although not necessarily, by the transfer tool or drawing-in tool 28, as shown in the example of FIG. 2, where it has been drawn half axially shifted downwards for the purpose of a better representation. In this example this tool is inserted with the two upper pins 74 in openings 76 and thus receives the coil in such a manner that after completion of the winding process with the help of the removable tool 28 an insertion eventually into a stator of an electric machine can follow afterwards.

In FIGS. 3 to 6 different consecutive stages of operation are represented, in a modified perspective as compared with FIG. 2. Whereas in FIG. 2 a side view, partly sectional, somewhat seen from below is shown, the perspective side view of FIGS. 3 to 6 is seen from above. The reference numbers used up to now indicate the same parts. Instead of the wire guide 20, which according to FIG. 2 has a cylindrical pot form, in FIGS. 3 to 6 a wire guide is represented with two arms, for the sake of better distinction. In the arm 19 the wire 18 is fed to a roll 21. The opposite arm 17 serves merely to counter-balance.

In the stage of operation illustrated in FIG. 3 a first three-layer coil 10 is just as wound and transferred to the tool 28 as has been previously described on principle with the aid of FIGS. 1 and 2. This wound coil 10 consists of the inner layer 12, the middle layer 14 and the outer layer 16.

At the end of the winding process of all three layers the pins 74 had deeply penetrated into the openings 76 (FIG. 2) as the form 30, firmly fitted on an inner axle 94, has been moved vertically downward by this axle (arrow H) so that the largest of the three stages of the winding form could be brought in the plane of the wire guide roll 21. Thereafter the motion of the wire guide 19 with its driving disc 68 was stopped and thereby also the motion of the swash plate 60. In this stage the plates 38, 42, 46 and 50 were axially right at the top in the body of the form 30. After the standstill of the winding motion they pass through the body of the form 30 axially downwards. For this purpose the outer hollow shaft 65 is coupled with the middle hollow shaft 84 which carries the perforated disk 56 and the drive of the swash plate 60. As a result of the axial downward motion of the plates 38, 42, 46 and 50 through the form 30, all windings are stripped off from the form and driven ultimately into the tool 28.

Hereby the wire 18 is not cut off but squeezed in a holder 96 which builds an intermediary loop 98 (FIG. 4) and holds the wire taut. The form 30 and the plates 38, 42, 46 and 50 are set again in an upward motion. The tool 28 is indexed in the direction of the arrow K (FIG. 3), that is to say brought in position for a subsequent winding process. This following winding process, as indicated on FIG. 3, begins anew on the smallest stage 34 of the form 30. After the tool 28 has been inserted in the form 30 to receive a subsequent coil 100 (FIG. 4), the holder 96 feeds the wire 18 on the stage 34, thereby maintaining the loop 98, and the winding process runs off as represented in FIG. 4.

During the winding the arm 19 of the wire guide rotates in the direction of the arrow B around the form 30 and the plates 42, 46 and 50 move synchronously with this motion B, as indicated by the double arrow F-G. Thereby all wound windings on the stage concerned of the form 30 are axially shifted downwards until they are received by the tool 28, as indicated by arrow L. The shift from one stage to the following stage of the form 30 can take place in a flying manner. The winding motion is carried on and merely a shift of the inner axle 94 results, whereby a next stage of the form 30 is brought in the plane of the roll 23. As a result of this flying transfer a few windings which have not been stripped off remain on the precedent stage. In this manner the stage of process according to FIG. 5 is reached. In this state the upper and the larger stage, as far as the section is concerned, of the form 30 is wire-wrapped, whereas on all precedent stages the windings which have not been stripped off yet are still there. In this FIG. 5 the shift of the relative position of the form 30 to the plates 42, 46 and 50 is recognizable.

Conformably with the representation on FIG. 6 the winding process of the coil 100 has been completed and the rotation motion has ceased. Both hollow shafts 65 and 84 are lowered in the direction of the arrow M, whereby all the plates 42, 46 and 50 move all together downwards and drive all remaining windings from each particular stage of the form 30 into the rods of the tool 28.

Thereafter the form 30 and the plates 42, 46 and 50 withdraw from the tool 28. Hereby a loop of the wire 18, similarly to loop 98, is held back by the holder 96, and after another indexing of the tool 28 the winding of another following coil can begin.

FIG. 7 represents a tool 28 with four electrically sequential coils, as can be used to insert into the stator of an electric machine. The tool 28 carries one after another each time in groups of rods 74 consecutive coils 10, 100 and 200 which can be fed either by hand or mechanically, in the direction of arrow N, for instance to the stator of an electric machine so that it can be inserted there.

In FIGS. 8, 9 and 10 other particularly advantageous forms of execution of the invention are represented in detail, which are also partly already recognizable in FIGS. 3 to 6. Accordingly the winding form 30 has a small stage 34, a medium stage 33 and a large stage 31. Each of these stages is subdivided over a part of the circumference in several fine stages, thus the stage 31 displays several stages 131, the stage 33 several stages 133 and stage 34 several stages 134. These fine stages are equally drawn on the right side of the representations of FIGS. 3 to 6 and hereby marked summarily with the number 130. With this fine subdivision the length of the winding can be advantageously varied within one particular stage. This results in a better distribution of the copper in the coil end and therefore a saving of copper.

For this purpose the winding form 30 can be adjusted over a motion of the axle 94 in such a way that a certain selected adjustment is brought in the winding plane. The circumference of this fine stage fixes then the length of the windings on this fine stage and thus different lengths of windings can arise on a winding stage 31, 33 or 34, graded in an adjustable manner.

Preferably only one definite sector S (FIG. 9) of the circumference of the winding form is finely graded. This segment can for instance amount to 120° and lies appropriately opposite the area in which the tool 28 and the form 30 combine their effect. At the same time two further advantageous variations are recognizable from FIG. 9. First of all it is evident that the fine graded right part does not need to have the same outline as the opposite part of the form. Then at the same time it is clear to see in connection with FIG. 10 how a new form divides itself in a radial direction, in order to make itself adjustable to different diameters. Hereby one part 200 — shown on FIG. 10 — of the form stays axially stationary so that the connection with the tool 28 may remain. The part 230 of the form, represented next to a parting line 210 on FIG. 10, together with the also parted perforated disk 156 and the plate lodged inside, is movable to the right so that the form is adjustable for different diameters.

We claim:

1. A method of forming a multi-layer coil by a winding device which winds a strand of wire about a winding form comprising the steps of:
   a. winding the wire on at least one surface of the winding form, said at least one surface being parallel to the axis of rotation of said winding device, and
   b. sequentially moving a plurality of stripper plates parallel to the axis of rotation of said winding device in synchronism with such winding device to move the wire wound on said at least one surface in a direction parallel to the axis of rotation of said winding device.

2. The method of claim 1 comprising the additional step of moving said plurality of stripper plates simultaneously in a direction parallel to the axis of rotation of the winding device to completely remove the wound coils from the winding form.

3. The method of claim 1 comprising the additional steps of:
   a. transferring the wound coils from the winding form to a transfer tool by the sequential movement of said stripper plates,
   b. gripping the wire strand by a stationary holding device between said winding form and said transfer tool, and
   c. rotating said transfer tool with respect to said winding form after a predetermined number of wound coils are placed thereon.

4. In a device for forming multi-layer coils having a winding form with at least one winding surface thereon, rotatable means to wind a strand of wire around said winding form, means to move said winding form axially with respect to said winding means, and a receiving tool engageable with said winding form to receive wound coils after their removal from said form, the improvements comprising:
   a. said at least one winding surface on said winding form being parallel to the axis of rotation of said rotatable winding means,
   b. a plurality of stripper plates movable in a direction parallel to the axis of rotation of said winding means,
   c. first means to move said stripper plates sequentially so as to move the wire wound on said winding form in a direction parallel to the axis of rotation of said winding means, and
   d. second means to simultaneously move said stripper plates in a direction parallel to the axis of rotation of said winding means so as to completely remove all of the wound coils on said winding form.

5. The improved device of claim 4 wherein the means to sequentially move said stripper plates comprises; a rotatable cam, the plane of the cam surface being disposed obliquely with respect to the axis of rotation of said winding means; cam followers attached to each stripper plate and engaging said cam surface, and spring means to bias said cam followers into engagement with said cam surface.

6. The improved device of claim 5 wherein said cam is rotated by the winding means.

7. The improved device of claim 4 wherein a sector of the circumference of the winding surface is subdivided into a plurality of further winding surfaces.

8. The improved device of claim 7 wherein the sector is 120°.

9. The improved device of claim 7 wherein the sector is located on the winding form opposite the engagement of the receiving tool.

10. The improved device of claim 4 wherein the stripper plates are slidably engageable in radial slots in the winding form.

11. The improved device of claim 4 wherein the winding form comprises a plurality of radially adjustable segments.

12. The improved device of claim 4 wherein the winding form has a polygonal cross-section and the stripping plates are disposed at the apexes of the polygon.

13. The improved device according to claim 4 wherein the stripping plates are displaceable up to the distal end of the form.

* * * * *